UNITED STATES PATENT OFFICE.

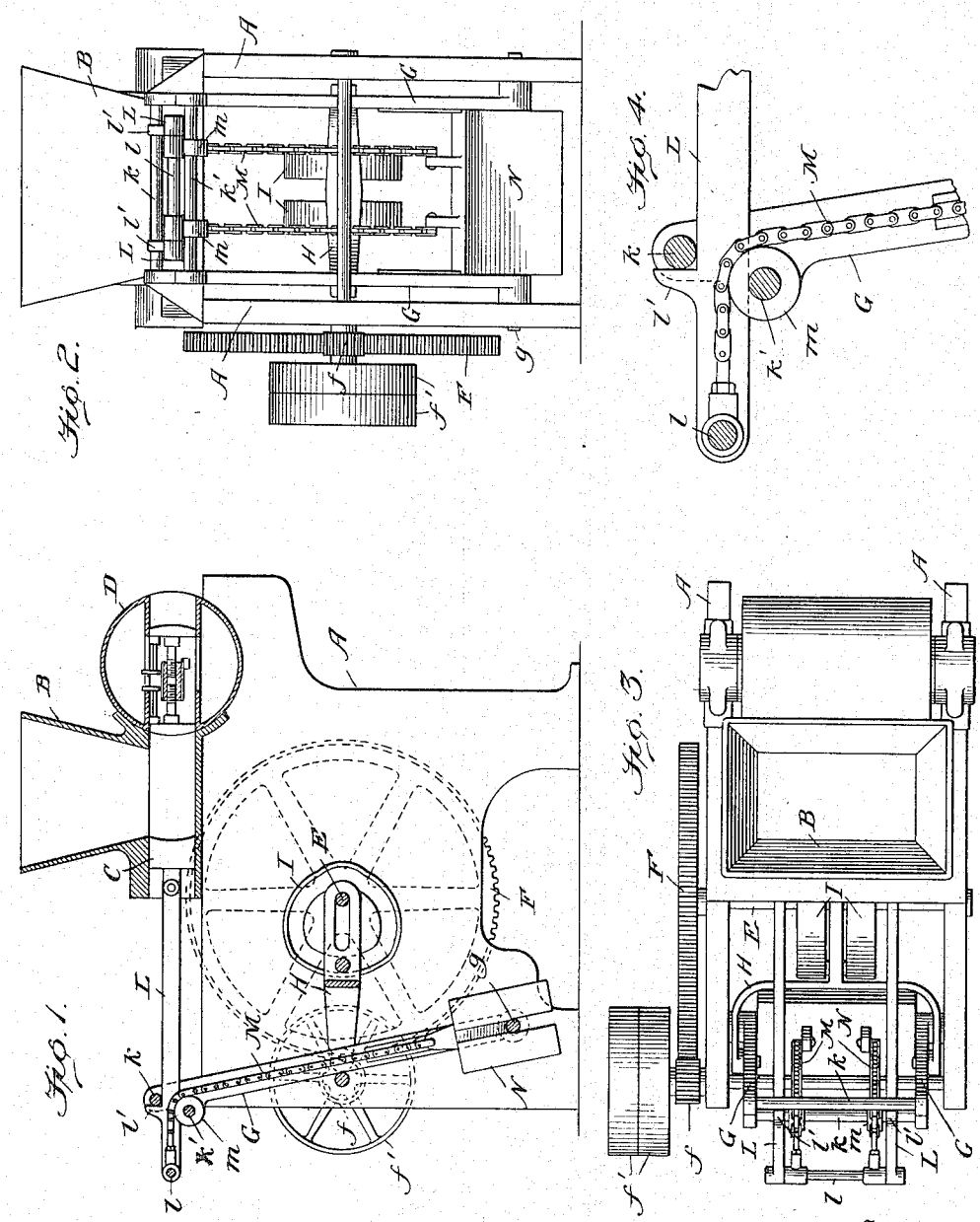

FRANK H. VAN HOUTEN, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

AUTOMATIC DOUGH-DIVIDER.

1,129,765.     Specification of Letters Patent.     Patented Feb. 23, 1915.

Application filed February 20, 1913. Serial No. 749,674.

*To all whom it may concern:*

Be it known that I, FRANK H. VAN HOUTEN, a citizen of the United States, and resident of Fishkill-on-the-Hudson, in the county of Dutchess and State of New York, have invented certain new and useful Improvements in Automatic Dough-Dividers; and I do hereby declare the following to be a full, clear, and exact description of the same, reference being had to the accompanying drawings, forming part of this specification, and to the figures and letters of reference marked thereon.

This invention relates to improvements in automatic dough dividers of that type wherein the mass of dough to be divided is deposited in a suitable hopper and portions thereof advanced to a cylinder or bread containing measuring pockets or chambers, by a reciprocatory plunger, provision being made whereby the pressure exerted on the dough by the plunger will be maintained substantially uniform so as to effect a uniform distribution and compression of the dough into the measuring pockets or chambers.

The objects of the invention are to provide an improved mechanism for operating the plunger so designed as to permit the plunger to lag behind its driving connection while exerting the desired pressure on the dough in front of it, but when no dough is present permitting the plunger to make its full stroke without operating the pressure creating and maintaining means. In other words, the invention is designed to save all wear and tear on the machine due to its operation when there is no dough present and to avoid the consumption of power by an operation of the pressure maintaining or creating devices when there is no resistance to the movement of the plunger.

The invention consists in certain novel details of construction and combinations and arrangements of parts all as will be hereinafter described and pointed out particularly in the appended claims.

Referring to the accompanying drawings,—Figure 1 is a sectional view in a vertical plane but with parts in elevation, of a machine embodying the present improvements; Fig. 2 is an end elevation of the same; Fig. 3 is a top plan view; and Fig. 4 is a detail of the parts shown in Fig. 1, but on a somewhat larger scale.

Similar letters of reference in the several figures indicate the same parts.

In the machine illustrated in the drawings, only those parts which are necessary for a complete understanding of the present invention are shown, and they embody essentially a main frame A surmounted by a hopper B having below it a channel in which a reciprocatory plunger C operates to advance portions of the dough into the measuring pockets or chambers in an intermittently rotated measuring head or cylinder D. Journaled in the main frame A is an operating shaft E which at one end carries a large wheel F driven from a pinion or small wheel $f$ on a second shaft journaled in the frame and usually carrying at its outer end, fast and loose belt pulleys $f'$.

Journaled near the bottom of the main frame and preferably on a cross shaft $g$ is a lever frame G which, through suitable connections to be presently described, is adapted to reciprocate the plunger C. The lever frame itself is oscillated through a driving connection or yoke frame H, pivotally connected therewith at one end and extending inwardly into position for coöperation with a cam or pair of cams I mounted on the drive shaft E, it being understood, of course, that the cams I are properly shaped to reciprocate the driving connection H in proper timed relation to the intermittent rotary movements of the measuring cylinder, whereby the dough will be advanced by the plunger and pressed into the measuring chambers when the latter are in position to receive it.

The lever frame G is at its upper end usually provided with cross pieces $k$, $k'$ between which extends a connecting rod frame usually formed by two side pieces or connecting rods L and a rear cross piece $l$, said side pieces being pivotally connected with the plunger C as will be readily understood. Outside of the upper cross piece K the connecting rod frame is provided with projections $l'$ with which the upper cross piece $k$ contacts when the lever frame is moved outwardly thereby insuring a full outward movement of the plunger at each operation of the lever frame. The lower cross piece $k'$ is provided with a pair of rollers or idlers *m* over which chains or flexible connections M are adapted to operate, the upper ends of said chains or flexible connections being secured to the outer end of the connecting rod frame, as, for example, by being joined to the cross piece *l* while the lower ends of said flexible connections are connected to a heavy weight N normally occupying a position in proximity to the pivotal axis of the lever frame and preferably with its center of gravity substantially coincident with the said axis, whereby oscillation of the lever frame operates to simply turn the weight about the axis without setting up objectionable vibrations or causing shock or strains to the mechanism, such as would be the case were the weight located at a distance from the axis. The weight is mounted to slide in or on guideways on the inner sides of the members constituting the lever frame, from which construction it is obvious that should the forward movement of the plunger C be arrested at any point in its travel the lever frame, continuing its forward oscillation, will operate to elevate the weight and the pressure exerted by the plunger will be in proportion to the size of the weight employed. The weight will be lifted in proportion to the quantity of dough in front of the plunger C, the same degree of pressure will be exerted on the dough, however, regardless of the distance it is lifted, and therefore the dough will be subjected to uniform pressure and condensation in the pockets throughout the whole effective area of the measuring pockets without regard to the quantity of dough being handled by the plunger, but when no dough is present to be operated on by the plunger, the latter is practically free and imposes no load on the driving mechanism other than such as may be incident to the friction of the parts.

Having thus described my invention, what I claim as new and desire to secure by Letters Patent of the United States, is:

1. In a dough divider, the combination with a measuring head, hopper and reciprocatory plunger for advancing the dough to the measuring head, of an operating mechanism for said plunger embodying a lever frame, means for oscillating said lever frame and plunger embodying a weight slidably mounted in the lever frame, and a flexible connection intermediate the weight and plunger whereby the weight is lifted when the forward movement of the plunger is arrested during the forward movement of the lever frame.

2. In a dough divider, the combination with the measuring head, hopper and plunger for advancing the dough to the measuring head, of an operating mechanism for said plunger embodying an oscillatory lever frame, a weight mounted to slide upwardly in said lever frame, a connecting rod for the plunger extending outwardly past the lever frame, and a flexible connection intermediate the rear end of said connecting rod and weight carried by the lever frame.

3. In a dough divider, the combination with a measuring head, a reciprocatory plunger for advancing the dough to said measuring head, an oscillatory lever frame, a weight mounted in said lever frame and movable bodily toward and from the pivot of the frame, a guide roller on the lever frame, a connecting rod for the plunger and a flexible connection intermediate the weight and rear end of the connecting rod and passing around said roller.

4. In a dough divider, the combination with the measuring head, reciprocatory plunger, connecting rod pivotally jointed thereto and oscillatory lever frame embodying guides for the connecting rod, of a weight slidably mounted in the oscillatory lever frame and normally resting in proximity to the pivot thereof, and a flexible connection between said weight and connecting rod for advancing the plunger and whereby the weight is elevated when the forward movement of the plunger is arrested.

5. In a dough divider, the combination with the measuring head, reciprocatory plunger, oscillatory lever frame having its axis at its lower end, and connecting rod jointed to the plunger and guided by the upper end of the lever frame, of a weight slidably mounted in the lever frame to move toward and from the pivot thereof, a flexible connection extending from said weight longitudinally of the lever frame and connecting at its end with the connecting rod, and a guide for said flexible connection mounted on the lever frame.

6. In a dough divider, the combination with the measuring head and reciprocatory plunger, of a plunger operating mechanism embodying an oscillatory member for transmitting motion to the plunger, and a loose connection intermediate said oscillatory member and plunger embodying a pressure maintaining weight normally located with its center of gravity substantially coincident with the axis of oscillation and adapted to be moved radially from said center when the advance movement of the plunger is arrested during the forward movement of the oscillatory member.

FRANK H. VAN HOUTEN.

Witnesses:
J. E. VAN HOUTEN,
ANNA F. DEVEREAUX.

Copies of this patent may be obtained for five cents each, by addressing the "Commissioner of Patents, Washington, D. C."